(12) United States Patent
Ishi

(10) Patent No.: US 8,740,518 B2
(45) Date of Patent: Jun. 3, 2014

(54) INSERT, CUTTING TOOL, AND METHOD OF MANUFACTURING MACHINED PRODUCT USING THEM

(75) Inventor: Hirohisa Ishi, Kyoto (JP)

(73) Assignee: Kyocera Corporation, Kyoto (JP)

( * ) Notice: Subject to any disclaimer, the term of this patent is extended or adjusted under 35 U.S.C. 154(b) by 112 days.

(21) Appl. No.: 13/642,425

(22) PCT Filed: Jun. 24, 2011

(86) PCT No.: PCT/JP2011/064514
§ 371 (c)(1),
(2), (4) Date: Oct. 19, 2012

(87) PCT Pub. No.: WO2012/002267
PCT Pub. Date: Jan. 5, 2012

(65) Prior Publication Data
US 2013/0045061 A1 Feb. 21, 2013

(30) Foreign Application Priority Data
Jun. 30, 2010 (JP) ................................ 2010-149692

(51) Int. Cl.
*B23C 5/20* (2006.01)
(52) U.S. Cl.
USPC ............... 409/132; 407/42; 407/61; 407/113
(58) Field of Classification Search
USPC .......... 409/131, 132; 407/42, 61, 62, 63, 113
IPC ............................. B23B 27/16; B23C 5/20,5/22
See application file for complete search history.

(56) References Cited

U.S. PATENT DOCUMENTS

| 3,416,209 | A | * | 12/1968 | Contrucci et al. | ............. 407/101 |
| 4,531,864 | A | | 7/1985 | Bylund | |
| 7,073,987 | B2 | | 7/2006 | Hecht | |
| 2004/0208713 | A1 | | 10/2004 | Duerr et al. | |
| 2006/0210364 | A1 | * | 9/2006 | Bellmann et al. | ............... 407/40 |
| 2009/0245950 | A1 | * | 10/2009 | Tanaka et al. | ................... 407/48 |

FOREIGN PATENT DOCUMENTS

| EP | 392729 A2 * | 10/1990 |
| JP | 58-223513 | 12/1983 |

(Continued)

OTHER PUBLICATIONS

First Office Action dated Apr. 16, 2013 issued by the Chinese Patent Office for Chinese Application No. 201180019168.1.

*Primary Examiner* — Daniel Howell
*Assistant Examiner* — Michael Vitale
(74) *Attorney, Agent, or Firm* — Volpe and Koenig, P.C.

(57) ABSTRACT

An insert according to an embodiment of the present invention includes an upper surface, a lower surface, a side surface which is connected to the upper surface and the lower surface, and includes a first side surface, and a cutting edge which is located an intersection of the upper surface and the side surface, and comprises a first cutting edge corresponding to the first side surface. The first cutting edge has a projected shape projected toward the upper surface in a side view, and has a recessed shape recessed inward in a top view. A cutting tool according to an embodiment of the present invention includes the insert and a holder configured to attach the insert thereto so that at least a part of the first cutting edge has a negative axial rake angle. A method of manufacturing a machined product according to an embodiment of the present invention is a method of manufacturing the machined product by using the cutting tool.

16 Claims, 7 Drawing Sheets

(56) References Cited

FOREIGN PATENT DOCUMENTS

| | | | |
|---|---|---|---|
| JP | 06190624 A * | 7/1994 | |
| JP | 10-100013 | 4/1998 | |
| JP | 11156625 A * | 6/1999 | |
| JP | 2004-284010 | 10/2004 | |
| JP | 2006-062048 | 3/2006 | |
| JP | 2006205298 A * | 8/2006 | |
| JP | 2008018530 A * | 1/2008 | |
| JP | 2009226577 A * | 10/2009 | |
| WO | 03/074218 A1 | 9/2003 | |

* cited by examiner

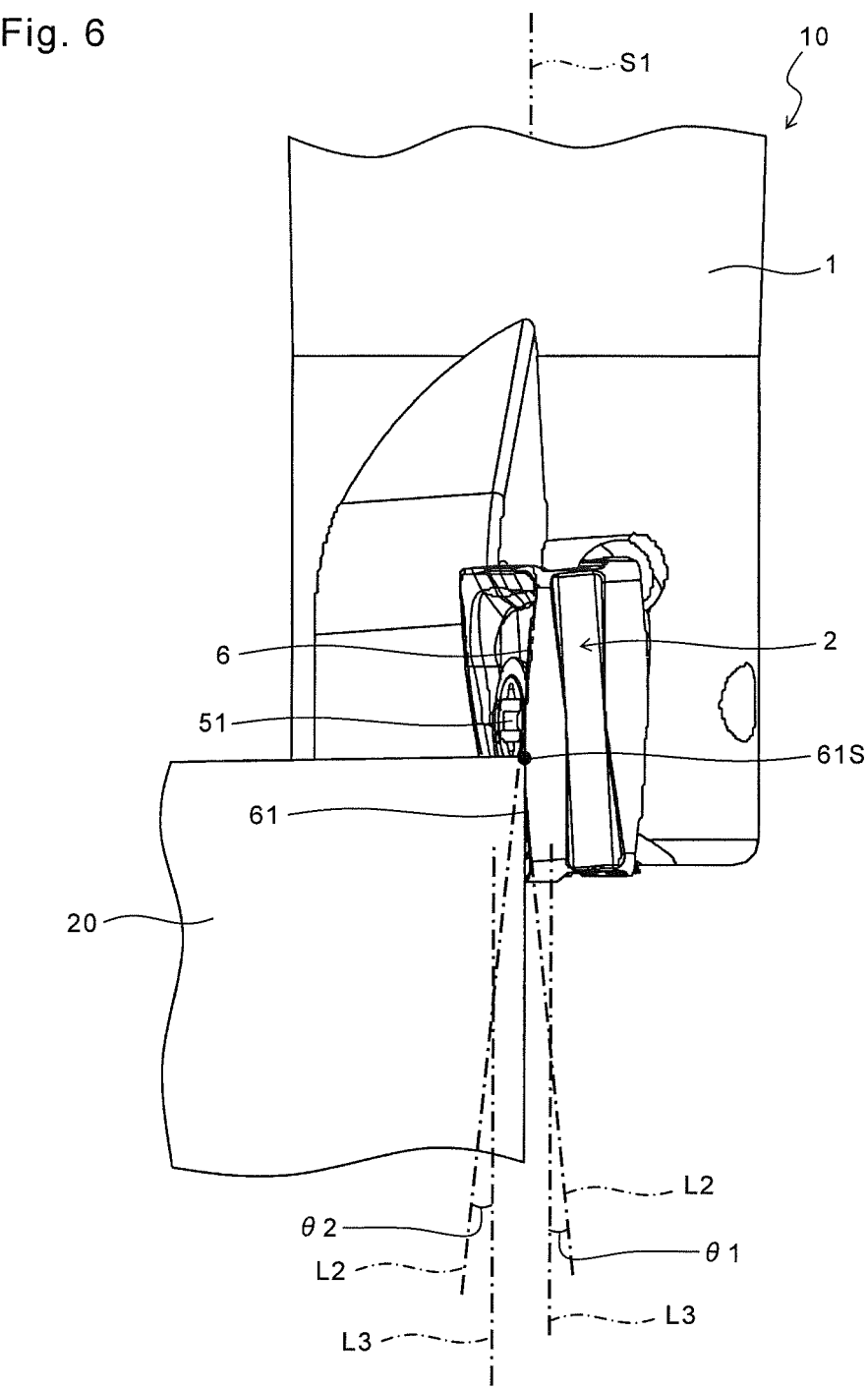

INSERT, CUTTING TOOL, AND METHOD OF MANUFACTURING MACHINED PRODUCT USING THEM

TECHNICAL FIELD

The present invention relates to an insert, a cutting tool, and a method of manufacturing a machined product using them.

BACKGROUND ART

As an example of a cutting insert (hereinafter referred to as "insert" in some cases) for cutting a workpiece, Japanese Unexamined Patent Publication No. 2004-284010 discloses a cutter insert used for a milling tool. This publication discloses that when the cutter insert is attached to a tool body, a positive axial rake angle can easily be achieved by multiple twisting a rectangular parallelepiped shaped basic form, and also discloses that a cutting edge of the cutter insert is curved in a linear or balloon shape.

However, because in the cutter insert of Japanese Unexamined Patent Publication No. 2004-284010, the axial rake angle is positive, the end portion of a peripheral surface cutting edge closer to the end surface of a cutting tool body, namely, the portions corresponding to corner parts in a planar view are firstly contacted against the workpiece during the cutting process. Hence, there is a risk of damage to the end portion of the peripheral surface cutting edge under cutting conditions that cause a large contact impact against the workpiece, such as high feed rate cutting.

SUMMARY OF THE INVENTION

An object of the present invention is to provide a cutting insert and a cutting tool which have excellent impact resistance with respect to their contact against a workpiece during the cutting process, and a method of manufacturing a machined product using the cutting insert and the cutting tool.

An insert according to an embodiment of the present invention includes an upper surface, a lower surface, a side surface which is connected to the upper surface and the lower surface, and has a first side surface, and a cutting edge which is located an intersection of the upper surface and the side surface, and comprises a first cutting edge corresponding to the first side surface. The first cutting edge has a projected shape projected toward the upper surface in a side view, and has a recessed shape recessed inward in a top view.

A cutting tool according to an embodiment of the present invention includes the insert and a holder configured to attach the insert thereto so that at least a part of the first cutting edge has a negative axial rake angle.

A method of manufacturing a machined product according to an embodiment of the present invention includes a first step of rotating the cutting tool; a second step of bringing the first cutting edge of the cutting tool being rotated into contact against a workpiece; and a third step of separating the cutting tool and the workpiece from each other. The first cutting edge except for an end portion thereof is firstly contacted against the workpiece in the second step.

In the insert according to the embodiment of the present invention, because the first cutting edge is projected toward the upper surface in the side view, a contact angle between the first cutting edge and the workpiece during a cutting process can be reduced to a relatively small angle, and hence, the impact force generated during the contact against the workpiece can be reduced or dispersed, thereby improving impact resistance. Additionally, because the first cutting edge is projected toward the upper surface in the side view, and is also recessed inward in the top view, a segment, which intersects a cross section parallel to the rotation axis of the holder in a rotational track drawn by the first cutting edge when the cutting tool attached to the holder is rotated, can be shaped like a straight line. This allows a target cutting surface (wall surface) of the workpiece to be precisely flattened.

BRIEF DESCRIPTION OF THE DRAWINGS

FIG. 6 is an enlarged view of essential parts showing a state in which the insert is brought into contact against a workpiece in the process of manufacturing the machined product in FIG. 5.

PREFERRED EMBODIMENTS FOR CARRYING OUT THE INVENTION

<Insert>

Figure 1:
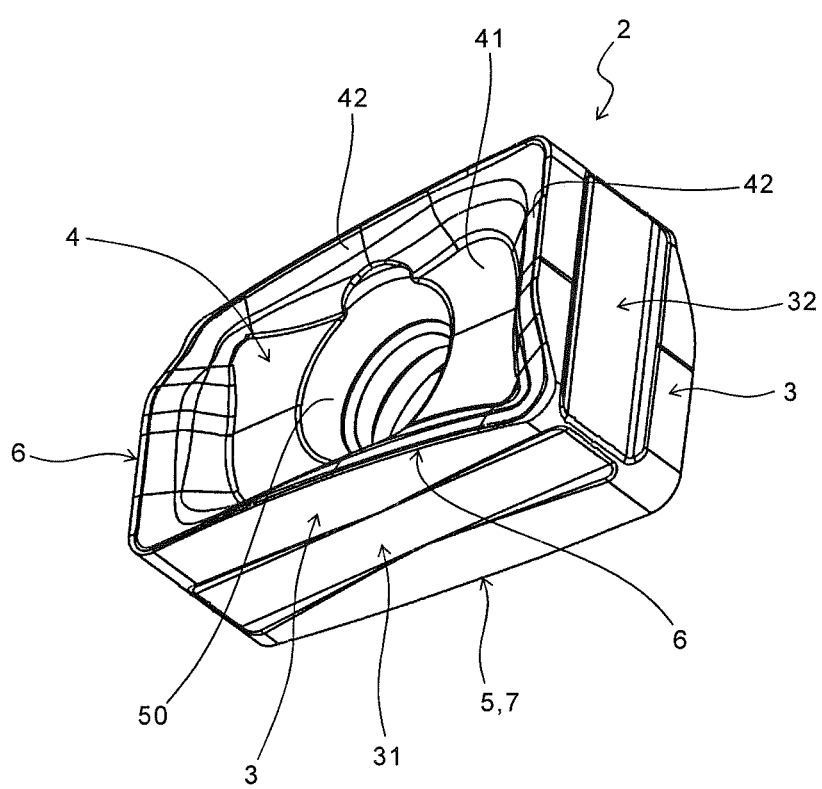
FIG. 1 is a perspective view showing an insert according to an embodiment of the present invention.

An insert according to an embodiment of the present invention is described in details with reference to FIGS. 1 and 2.

As shown in FIGS. 1 and 2, the insert 2 of the present embodiment includes a rectangular (substantially rectangular) insert body (not shown) in a top view, a side surface 3 having a flank surface, an upper surface 4 having a rake surface 42, and a lower surface 5 having a seating surface. That is, the shape of a contour surrounded by the side surface 3 is a rectangle, and the side surface 3 has a first side surface 31 (major side surface) corresponding to a long side thereof and a second side surface 32 (flat side surface) corresponding to a short side thereof in the top view. The side surface 3 is connected to the upper surface 4 and the lower surface 5, respectively. The insert 2 includes a cutting edge 6 along an intersection of the upper surface 4 and the side surface 3, and a cutting edge 7 along an intersection of the lower surface 5 and the side surface 3.

In the present embodiment, the insert body has a rectangular parallelepiped shape. In other words, a straight line L1 connecting an upper end 3a of the side surface 3 located closer to the upper surface 4 and a lower end 3b thereof located closer to the lower surface 5 is parallel to a central axis S2 extending between the upper and lower surfaces of the insert 2 in a side view including the first side surface 31 shown in FIG. 2(c). This allows the insert 2 to perform cutting with the cutting edge 7 located closer to the lower surface 5 similarly to the cutting edge 6 located closer to the upper surface 4. The straight line L1 is the straight line vertical to the seating surface of the lower surface 5. In the present embodiment, the upper surface 4 and the lower surface 5 have the same configuration, and therefore, the overlapping descriptions are omitted for the sake of simplicity.

The insert 2 has the cutting edge 6 along the intersection of the upper surface 4 and the side surface 3, as described above. Specifically, corner cutting edges 63 (63a and 63b) are respectively located at corner parts of the insert body. A major cutting edge 61 lying in the longitudinal direction of the insert 2, and a flat cutting edge 62 lying in the transverse direction thereof are formed between the two corner cutting edges 63 and 63 lying on a diagonal line. In other words, the major cutting edge 61 is a first cutting edge 61 lying along the intersection of the upper surface 4 and the first side surface 31, and the flat cutting edge 62 is a second cutting edge 62 lying along the intersection of the upper surface 4 and the second side surface 32. The corner cutting edges 63 are located to connect the first cutting edge 61 and the second cutting edge 62. The individual components are described in more details below. The major cutting edge 61 performs a major role in cutting, and the flat cutting edge 62 performs a role in smoothly finishing a cutting target surface cut by the major cutting edge 61.

Figure 2A:
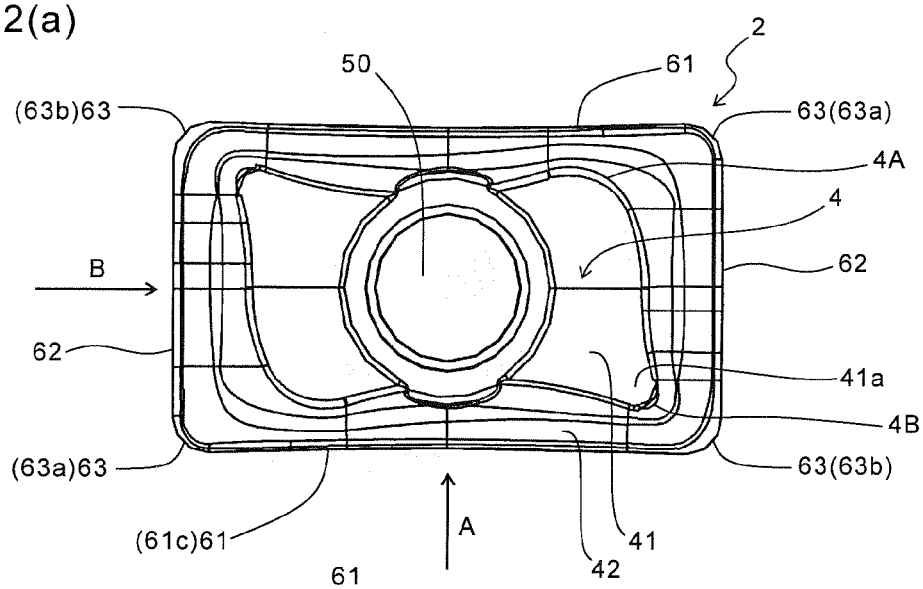
FIG. 2(a) is a top plan view of the insert shown in FIG. 1.
Figure 2B:
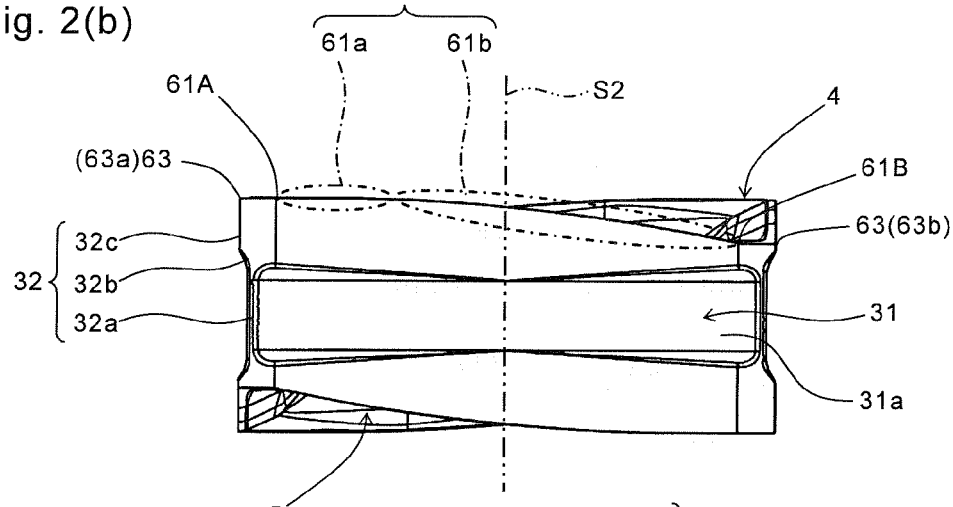
FIG. 2(b) a side view thereof, taken in a direction of arrow A in FIG. 2(a)

As shown in FIGS. 2(a) and 2(b), the corner cutting edges 63 include two high-position corner cutting edges 63a and 63a (high-position portions) located on one diagonal line, and two low-position corner cutting edges 63b and 63b (low-position portions) which are located at a lower position in a thickness direction of the insert body than the high-position corner cutting edges 63a, and are located on the other diagonal line in a top view. The high-position corner cutting edges 63a are the cutting edges used for cutting, and a radius of curvature thereof is preferably usually about 0.4 to 6.4 mm in terms of the balance between cutting edge strength and machining shape.

The major cutting edge 61 is projected toward the upper surface 4 in a side view as shown in FIG. 2(b), and is recessed inward in a top view, as shown in FIG. 2(a). Thus, because the major cutting edge 61 is projected toward the upper surface 4 in the side view, a contact angle between the major cutting edge 61 and a workpiece 20 during the cutting process can be reduced to a relatively small angle, and hence, impact force generated during the contact against the workpiece 20 can be reduced or dispersed, thereby improving impact resistance (refer to FIG. 6). Additionally, the major cutting edge 61 is projected toward the upper surface 4 in the side view, and is recessed inward in the top view. Therefore, a segment, which intersects a cross section parallel to a rotation axis S1 of the holder 1 in a rotational track drawn by the major cutting edge 61 when attached to the holder 1 and then rotated, can be shaped like a straight line. This allows the cutting target surface (wall surface) 20a of the workpiece 20 to be precisely flattened (refer to FIG. 7). In the present specification, the term "inward" denotes the inside of the insert 2 with respect to the major cutting edge 61, specifically, the side closer to a through hole 50 described later.

The major cutting edge 61 is described in more details below. In the present embodiment, as shown in FIG. 2(b), the major cutting edge 61 includes one end 61A located closer to the flat cutting edge 62, and the other end 61B located opposite the one end 61A in a side view. The other end 61B of the major cutting edge 61 is located lower than the one end 61A in the thickness direction of the insert body in the side view. The major cutting edge 61 is inclined to be closer to the lower surface 5 as going from the one end 61A to the other end 61B. The major cutting edge 61 further includes a linear part 61a and a convex curved part 61b which is a curved line connected to the linear part 61a, and is projected toward the upper surface 4. The convex curved part 61b has a larger length than the linear part 61a. The linear part 61a is vertical to the central axis S2 extending between the upper and lower surfaces.

In other words, the linear part 61a has substantially the same height as the high-position corner cutting edges 63a, and the height of the convex curved part 61b is gradually lowered from the high-position corner cutting edges 63a to the low-position corner cutting edges 63b. The linear part 61a has a function to hold the strength of the high-position corner cutting edges 63a used for the cutting process, and requires strength because it is brought into a relatively strong contact against the workpiece 20 during the cutting process. In order to satisfy compatibility between the strength and cutting angle retention, the linear part 61a is formed at substantially the same height as the high-position corner cutting edges 63a. An axial rake angle is imparted to the insert 2 itself by including the convex curved part 61b. Hence, cutting performance can be improved, and cutting resistance can be reduced while leaving the seating surface 12 of the holder 1 as thick as possible. In another embodiment, the linear part 61a may be inclined to be further away from the lower surface 5 as going to the convex curved part 61b.

As shown in FIG. 2(a), the major cutting edge 61 includes an arcuate concave curved part 61c in a top view. This allows the shape of the major cutting edge 61 to be continuously moderately changed, thereby ensuring relatively high strength of the major cutting edge 61.

Preferably, the convex curved part 61b has a radius of curvature R1, and the concave curved part 61c has a radius of curvature R2, and the radius of curvature R1 is smaller than the radius of curvature R2. This ensures relatively high strength of the major cutting edge 61.

Figure 2C:
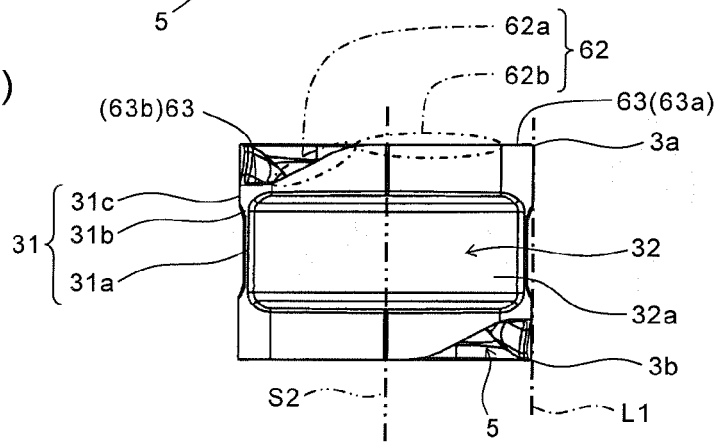
FIG. 2(c) is a side view thereof, taken in a direction of arrow B in FIG. 2(a)

The flat cutting edge 62 has a shorter length than the major cutting edge 61, and includes an inclined part 62a and a linear part 62b connected to the inclined part 62a, as shown in FIG. 2(c). The inclined part 62a is inclined to be further away from the lower surface 5 as going to the linear part 62b. The linear part 62b is vertical to the central axis S2 extending between the upper and lower surfaces of the insert 2.

The upper surface 4 includes a rake surface as described above. The rake surface 42 denotes a surface of the upper surface 4 along which generated chips graze. The upper surface 4 further includes a flat seating surface 41 continuous with the rake surface 42. This allows the chips to be curled or divided, thus satisfactorily discharging the generated chips. In the present embodiment, the rake surface 42 lies along the cutting edge 6, and is continuously inclined to be closer to the lower surface 5 as going inward of the insert 2, and is connected to the flat seating surface 41 in a top view (refer to FIG. 1). In other words, the upper surface 4 is not provided with a so-called rising surface and thus ensures a large thickness between the upper surface 4 and the lower surface 5 of the insert 2, thereby achieving more excellent impact resistance.

The through hole 50 extending through the lower surface 5 is formed at a mid-portion of the upper surface 4. The through hole 50 is provided for fixing the insert 2 to the holder 1. The insert 2 has a 180-degree rotationally symmetrical shape with respect to a central axis of the through hole 50, namely, the central axis S2 extending between the upper and lower surfaces of the insert 2. Hence, when one of the cutting edges 6 being used is worn, the other cutting edge 6 not yet used can be used by rotating the insert 2 180 degrees. This is easy to use.

The lower surface 5 has a configuration similar to the foregoing upper surface 4. Therefore, the lower surface 5 includes a flat seating surface (not shown) similar to that of the upper surface 4. When a comparison is made between one end of the seating surface located closer to the first side surface 31 and the other end located opposite the one end in terms of a distance from the seating surface to an intersection of the lower surface 5 and the second side surface 32 in a bottom view, the other end has a shorter distance than the one end. In other words, as shown in FIG. 2(a), when a comparison is made between one end 4A of the seating surface 41 located closer to the first side surface 31 and the other end 4B located opposite the one end 4A in terms of a distance from the seating surface 41 to the intersection of the upper surface 4 and the second side surface 32 (flat cutting edge 62) in a top view, the other end 4B has a shorter distance than the one end 4A. Accordingly, an extended portion 41a as shown in FIG. 2(a) is also formed on the lower surface 5. Consequently, a larger cutting force is exerted on the other end described above when the insert 2 is attached to the holder 1 and the cutting process is carried out with the cutting edge 6 closer to the upper surface 4. However, a region usable for attaching the insert 2 to the holder 1 can be increased for improving attachment reliability by increasing the region closer to the other end in the seating surface. Similarly, when the cutting process is carried out with the cutting edge 7 closer to the lower surface 5, a similar effect is obtainable by the extended portion 41a in the seating surface 41 of the upper surface 4.

As shown in FIGS. 2(b) and 2(c), the side surface 3 has inwardly recessed constraining parts 31a and 32a in an intermediate region between the upper surface 4 and the lower surface 5. The constraining parts 31a and 32a are the parts to be connected to (constrained by) the holder 1 when the insert 2 is attached to the holder 1, and require attachment reliability in order to reduce the occurrence of vibration during the cutting process. No special limitation is imposed on the position of the intermediate region as long as the intermediate region is located in a certain region other than the upper and lower end portions of the side surface 3.

The constraining part 31a lies over the entire length in the width direction of the first side surface 31 in a side view including the first side surface 31 shown in FIG. 2(b), and the constraining part 32a lies over the entire length in the width direction of the second side surface 32 in a side view including the second side surface 32 shown in FIG. 2(c). Preferably, the constraining parts 31a and 32a respectively include a flat surface-shaped part. In the present embodiment, the constraining parts 31a and 32a are shaped flat over their entire length. This increases the region usable when the insert 2 is attached to the holder 1, thus improving the degree of freedom of attachment modes. In another embodiment, the constraining parts 31a and 32a may be configured so that their middle region in the width direction of the side surface is expanded outward compared to their end region. This enhances the strength of the major cutting edge 61 that is recessed inward in a top view.

As shown in FIGS. 2(b) and 2(c), the side surface 3 further includes thick portions 31c and 32c which are located closer to the upper surface 4 than the constraining parts 31a and 32a, and are continuous with the constraining parts 31a and 32a, respectively. In the present embodiment, intersections 31b and 32b of the constraining parts 31a and 32a and the thick portions 31c and 32c, respectively, are recessed in a side view, as shown in FIGS. 2(b) and 2(c). It is therefore capable of dispersing the force exerted on the intersections 31b and 32b by the vibrations during the cutting process, thereby reducing the fracture of the intersections 31b and 32b.

<Cutting Tool>

Next, a cutting tool according to an embodiment of the present invention is described with reference to FIGS. 3 and 4, taking as an example the cutting tool with the foregoing insert 2 attached thereto. The present embodiment describes an end mill that is one kind of cutting tools.

As shown in FIG. 3, the cutting tool 10 according to the present embodiment is the end mill including a plurality of inserts 2 and the columnar (substantially columnar) holder 1 in which a plurality of insert pockets (hereinafter referred to as "pockets") 11 for detachably attaching the plurality of inserts 2 are arranged along a front end outer periphery of the holder 1. The cutting tool 10 performs cutting with the inserts 2 by rotating the holder 1 around the rotation axis S1 thereof.

Figure 3A:
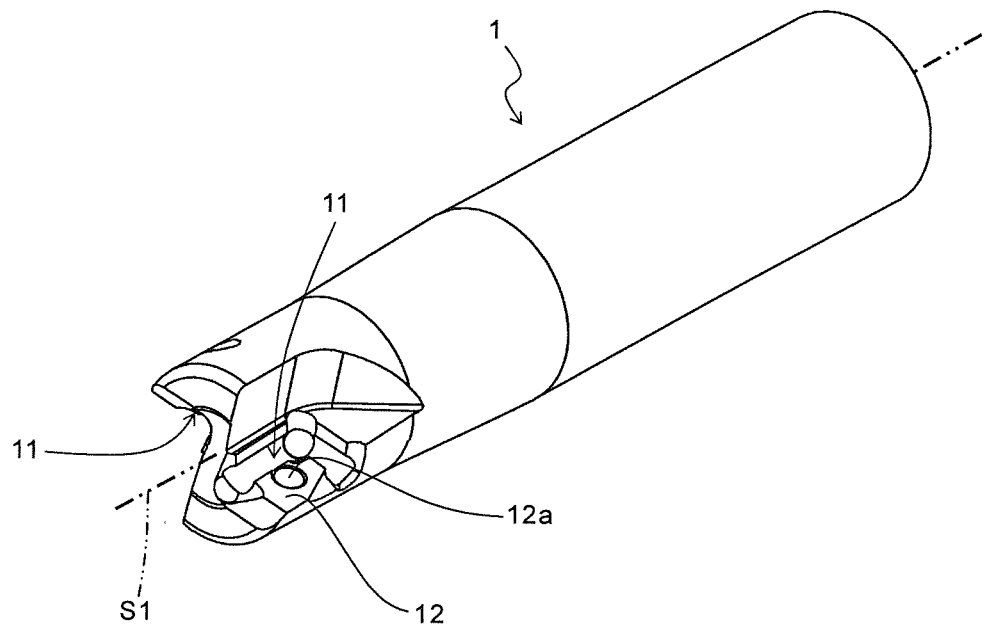
FIG. 3(a) is a perspective view of a holder alone according to an embodiment of the present invention.
Figure 3B:
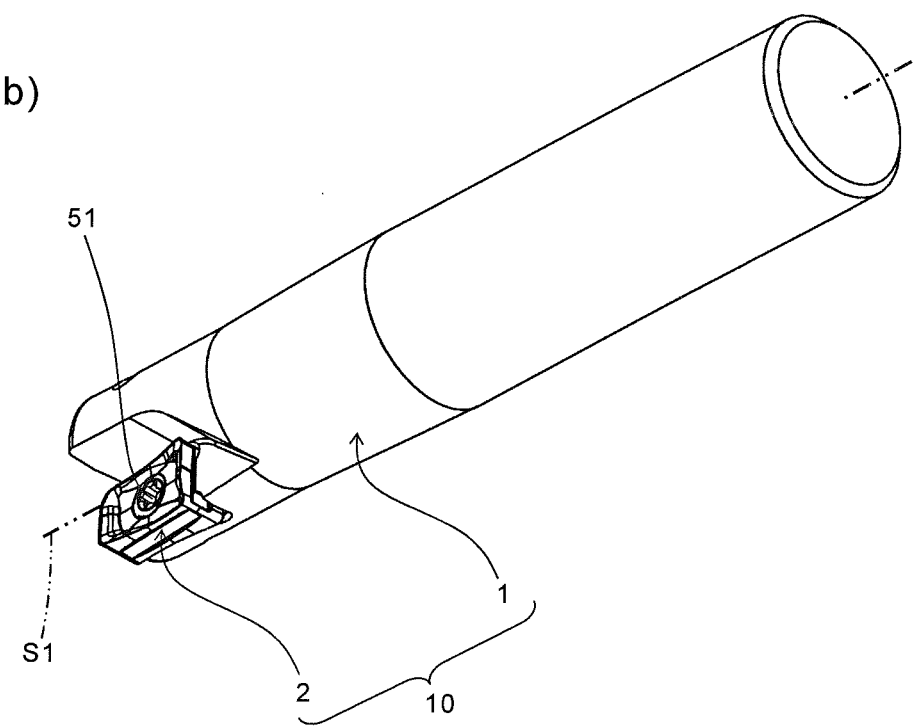
FIG. 3(b) is a perspective view showing the holder of FIG. 3(a) having the insert attached thereto (a cutting tool)
Figure 4A:
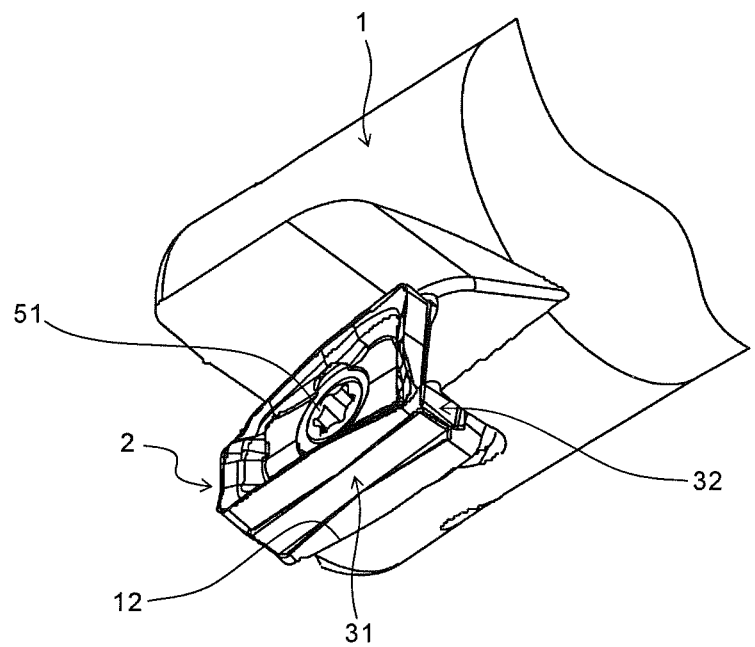
FIG. 4(a) is a perspective view showing in enlarged dimension a front end region of the holder in FIG. 3(b)
Figure 4B:
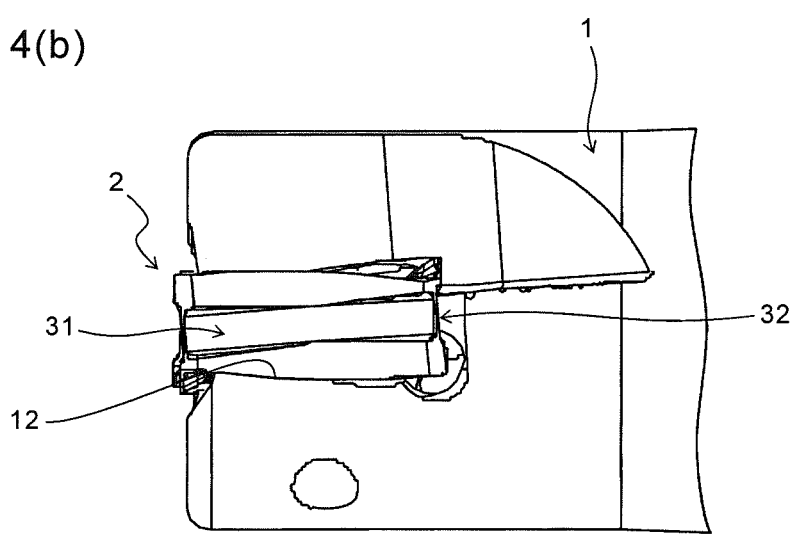
FIG. 4(b) is a side view thereof.

To be specific, as the pockets 11 disposed along the front end outer periphery of the holder 1, the two pockets 11 are disposed in a circumferential direction of the holder 1, as shown in FIG. 3(a). The two inserts 2 are detachably attached to the two pockets 11 disposed in the direction of the rotation axis S1 by inserting a fastening screw 51 into the through hole 50 of the insert 2, and by screwing the front end of the fastening screw 51 through a screw hole 12a formed in the seating surface 12 of each of the pockets 11, as shown in FIGS. 3(b) and 4.

In the present embodiment, the insert 2 is attached to the holder 1 in a state in which at least a part of the major cutting edge 61 has a negative axial rake angle as shown in FIG. 6 described later. More specifically, the major cutting edge 61 preferably has a negative axial rake angle in a length region from an end portion located closer to the front end of the holder 1 to a middle portion thereof (for example, a middle point thereof). This achieves a relatively small contact angle between the major cutting edge 61 and the workpiece 20 during the cutting process. Therefore, the impact force generated during the contact against the workpiece 20 can be reduced or dispersed, consequently improving the durability of the cutting tool 10.

The rest of the major cutting edge 61 is preferably configured to have a positive axial rake angle, thus reducing the cutting resistance exerted on the rest thereof. This achieves two advantages of the foregoing impact resistance and cutting resistance reduction. Here, the negative axial rake angle denotes that a tangent L2 at a predetermined location of the cutting edge 6 is in an inclined state as indicated by $\theta 1$ in FIG. 6 with respect to a straight line L3 parallel to the rotation axis S1 of the holder 1. Similarly, the positive axial rake angle denotes that the tangent L2 is in an inclined state as indicated by $\theta 2$ in FIG. 6.

As shown in FIG. 6, the inserts 2 are attached to the holder 1 so that when the cutting tool 10 is brought into contact against the workpiece 20 by rotating the cutting tool 10, the major cutting edge 61 except for an end portion thereof, namely, a contact start point 61S is firstly contacted against the workpiece 20. By attaching the inserts 2 to the holder in this specific arrangement, the impact force generated during the contact against the workpiece 20 can be reduced or dispersed, thereby improving the impact resistance of the inserts 2 or the cutting tool 10.

<Method of Manufacturing Machined Product>

Figure 7:
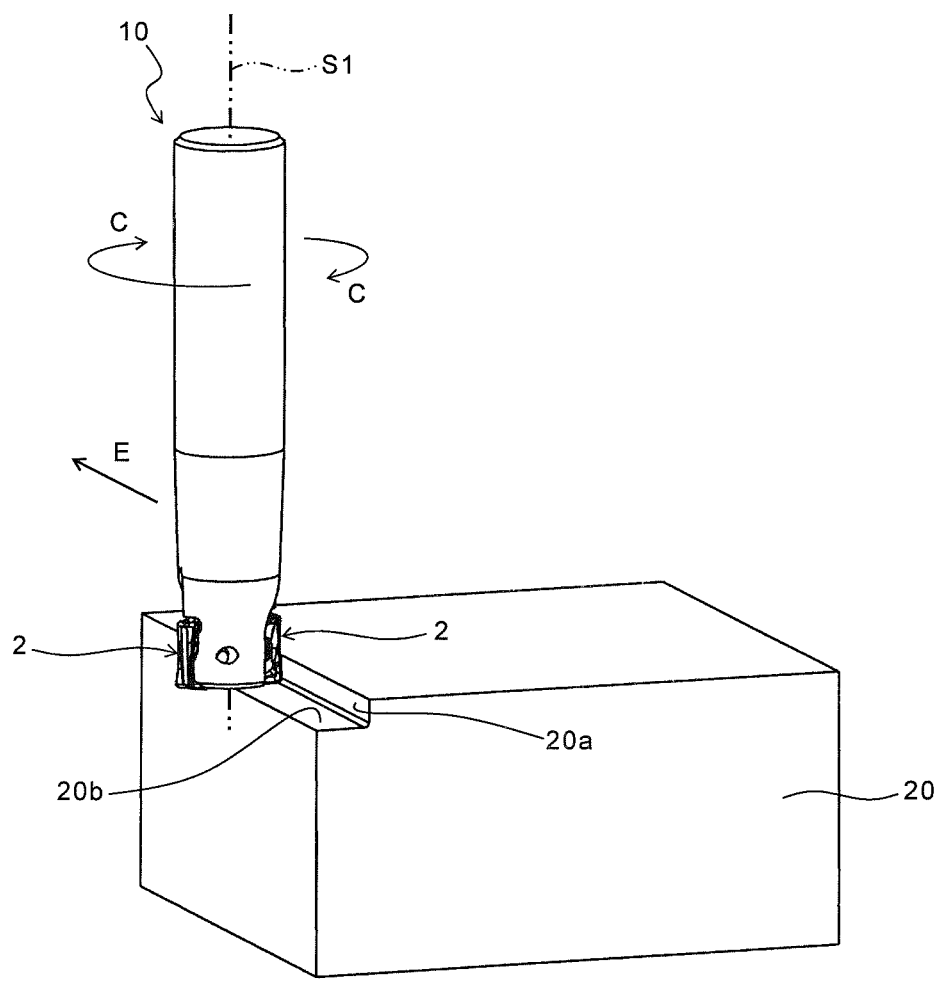
FIG. 7 is an explanatory drawing showing a state of a cut portion of the workpiece in the process of manufacturing the machined product in FIG. 5.

A method of manufacturing a machined product according to an embodiment of the present invention is described below with reference to FIGS. 5 to 7, taking as an example the case where the inserts 2 and the cutting tool (end mill) 10 with the inserts 2 attached thereto are applied to a shouldering process.

The method of manufacturing the machined product according to the present embodiment includes the following steps (i) to (iv).

Figure 5A:
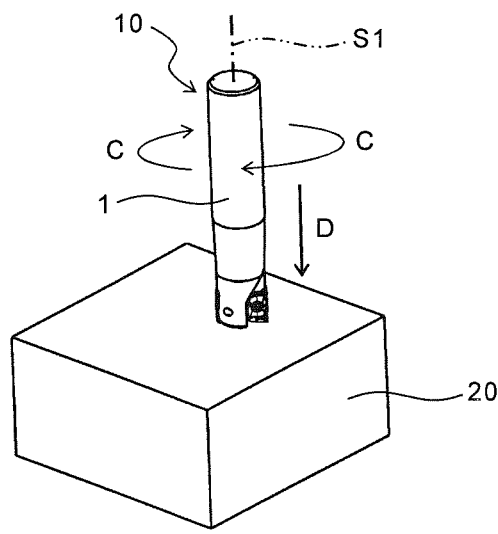
FIGS. 5(a) to 5(c) are process drawings for explaining a method of manufacturing a machined product by using the cutting tool of FIG. 3(b)

(i) Rotating the cutting tool 10 around the rotation axis S1 of the holder 1 and in a direction of arrow C, as shown in FIG. 5(a) (the first step).

(ii) Bringing the cutting tool 10 being rotated near the workpiece 20 by moving the cutting tool 10 in a direction of arrow D, as shown in FIG. 5(a) (the first step). The workpiece 20 and the cutting tool 10 may be relatively close to each other. Instead of the foregoing manner, for example, the workpiece 20 may be brought near the cutting tool 10.

Figure 5B:
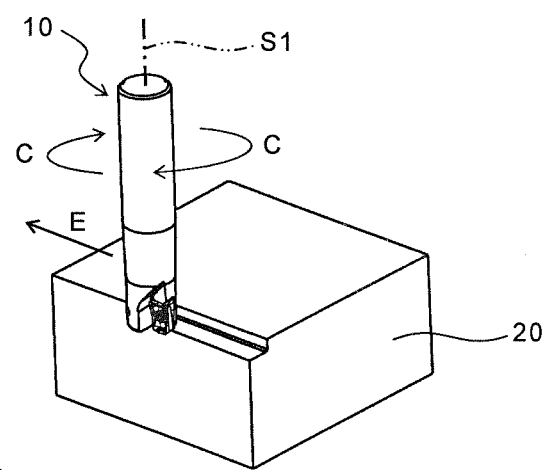

(iii) Bringing the major cutting edge 61 of the cutting tool 10 being rotated into contact against the workpiece 20, in which the major cutting edge 61 except for the end portion thereof is firstly contacted against the workpiece 20, as shown in FIGS. 5(b) and 6 (the second step).

In the present embodiment, the shouldering process is carried out by moving the cutting tool 10 in a direction of arrow E. The impact force generated during the contact against the workpiece 20 can be reduced or dispersed by allowing the major cutting edge 61 except for the end portion thereof, namely, the contact start point 61S to be firstly contacted against the workpiece 20, as shown in FIG. 6. This improves the impact resistance of the inserts 2 or the cutting tool 10. Additionally, because the major cutting edge 61 of the insert 2 is projected toward the upper surface 4 in the side view, and is also recessed inward in the top view, the segment, which intersects the cross section parallel to the rotation axis S1 of the holder 1 in the rotational track drawn by the major cutting edge 61 when the cutting tool 10 attached to the holder 1 is rotated, can be shaped like the straight line. This allows the target cutting surface (wall surface) 20a of the workpiece 20 to be precisely flattened, as shown in FIG. 7.

Figure 5C:
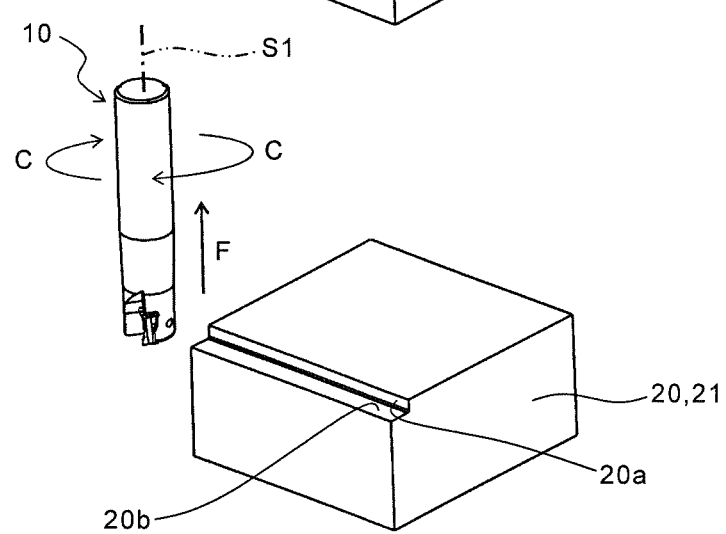

(iv) Separating the cutting tool 10 from the workpiece 20 by moving the cutting tool 100 in a direction of arrow F, as shown in FIG. 5(c) (the third step). The workpiece 20 and the cutting tool 10 may be relatively separated from each other. Instead of the foregoing manner, for example, the workpiece 20 may be separated from the cutting tool 10.

The machined product 21 having the wall surface 20a and a machined surface 20b is obtainable by carrying out the foregoing steps (i) to (iv). When the cutting process is further continued, it is required to repeat the step of cutting the workpiece 20 by bringing the cutting edge 6 of the cutting tool 10 into contact against different portions of the workpiece 20, while holding the rotation of the workpiece 10. The insert 2 is configured to permit use of two corners on one surface thereof, namely, four corners on the upper and lower surfaces thereof. Therefore, when one of the cutting edges 6 in use is worn, the other cutting edges 6 or 7 not yet used may be used.

While the preferred embodiments of the present invention have been described and illustrated above, it is to be understood that the present invention is not limited to the foregoing embodiments, and various changes and modifications can be made therein without departing from the spirit or scope of the present invention.

The invention claimed is:

1. An insert, comprising:
    an upper surface;
    a lower surface;
    a side surface which is connected to the upper surface and the lower surface, and comprises a first side surface; and
    a cutting edge which is located at an intersection of the upper surface and the side surface, and comprises a first cutting edge corresponding to the first side surface,
    wherein the first cutting edge has a projected shape projected toward the upper surface in a side view, and has a recessed shape recessed inward in a top view
    wherein the first cutting edge comprises a linear part, and a convex curved part which is connected to the linear part and is a curved line projected toward the upper surface in the side view,
    wherein the linear part is perpendicular to a central axis extending between the upper and lower surfaces of the insert.

2. The insert according to claim 1, wherein one end of the first cutting edge is located at a lower position than the other end thereof in the side view.

3. The insert according to claim 2, wherein the first cutting edge is inclined to be closer to the lower surface as the first cutting edge going from the one end to the other end in the side view.

4. The insert according to claim 1, wherein the first cutting edge comprises an arcuate concave curved part in the top view.

5. The insert according to claim 1, wherein the first cutting edge comprises a convex curved part having a radius of curvature R1 in the side view, and a concave curved part having a radius of curvature R2 in the top view, and the radius of curvature R1 is smaller than the radius of curvature R2.

6. The insert according to claim 1, wherein the side surface further comprises a constraining part recessed inward in an intermediate region between the upper surface and the lower surface.

7. The insert according to claim 6, wherein the constraining part lies over an entire length in a width direction of the first side surface in a side view including the first side surface.

8. The insert according to claim 6, wherein the constraining part comprises a flat surface part.

9. The insert according to claim 6, wherein
    the side surface further comprises a thick portion which is located closer to the upper surface than the constraining part and is continuous with the constraining part, and
    an intersection of the constraining part and the thick portion has a concave shape in the side view.

10. The insert according to claim 1, wherein
    the side surface has a straight line which connects an upper end thereof located closer to the upper surface and a lower end thereof located closer to the lower surface, and is parallel to the central axis extending between the upper and lower surfaces of the insert, in a side view including the first side surface.

11. The insert according to claim 1, wherein
    a shape of a contour surrounded by the side surface is a rectangle in the top view, and
    the side surface further comprises a second side surface which is connected to the first side surface and has a shorter length in the top view than the first side surface.

12. The insert according to claim 11, wherein
    the lower surface comprises a flat seating surface, and
    a distance, from the seating surface to an intersection of the lower surface and the second side surface, is smaller at one end of the seating surface located closer to the first side surface than at the other end of the seating surface located opposite the one end in a bottom view.

13. The insert according to claim 1, further comprising a through hole extending through the upper and lower surfaces.

14. A cutting tool, comprising: an insert according to claim 1; and a holder configured to attach the insert thereto in a state that at least a part of the first cutting edge has a negative axial rake angle.

15. The cutting tool according to claim 14, wherein the first cutting edge has a negative axial rake angle in a length region from an end portion of the first cutting edge located closer to a front end of the holder to a mid-portion of the first cutting edge.

16. A method of manufacturing a machined product, comprising:
- a first step of rotating a cutting tool according to claim 14;
- a second step of bringing the first cutting edge of the cutting tool being rotated into contact against a workpiece; and
- a third step of separating the cutting tool and the workpiece from each other,
- wherein the first cutting edge except for an end portion thereof is firstly contacted against the workpiece in the second step.

* * * * *